(12) United States Patent
Iwasawa et al.

(10) Patent No.: US 8,681,323 B2
(45) Date of Patent: Mar. 25, 2014

(54) LASER SCANNING SENSOR

(75) Inventors: Masashi Iwasawa, Otsu (JP); Seongho Cho, Otsu (JP)

(73) Assignee: Optex Co., Ltd., Shiga (JP)

( * ) Notice: Subject to any disclaimer, the term of this patent is extended or adjusted under 35 U.S.C. 154(b) by 126 days.

(21) Appl. No.: 13/384,425

(22) PCT Filed: Jul. 16, 2010

(86) PCT No.: PCT/JP2010/062033
§ 371 (c)(1),
(2), (4) Date: Jan. 17, 2012

(87) PCT Pub. No.: WO2011/007855
PCT Pub. Date: Jan. 20, 2011

(65) Prior Publication Data
US 2012/0113410 A1    May 10, 2012

(30) Foreign Application Priority Data

Jul. 17, 2009  (JP) .................................. 2009-169141

(51) Int. Cl.
*G01C 3/08*   (2006.01)
(52) U.S. Cl.
USPC .......... 356/5.01; 356/3.01; 356/4.01; 356/5.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,910,767 A | 6/1999 | Frucht | |
| 6,188,319 B1 | 2/2001 | Frucht | |
| 2004/0257556 A1 * | 12/2004 | Samukawa et al. | .......... 356/4.01 |
| 2009/0091447 A1 | 4/2009 | Iwasawa | |
| 2009/0109421 A1 | 4/2009 | Iwasawa | |

FOREIGN PATENT DOCUMENTS

| | | |
|---|---|---|
| EP | 2 048 517 | 4/2009 |
| EP | 2 053 427 | 4/2009 |
| JP | 04-278487 | 10/1992 |
| JP | 10-090412 | 4/1998 |
| JP | 2000-035479 | 2/2000 |
| JP | 2000-046948 | 2/2000 |
| JP | 3011121 | 2/2000 |
| JP | 2003-057345 | 2/2003 |
| JP | 2003-114277 | 4/2003 |
| JP | 2004-185363 | 7/2004 |

(Continued)

OTHER PUBLICATIONS

Supplementary European Search Report issued Jan. 11, 2013 in corresponding European Patent Application No. 10799913.8.

(Continued)

*Primary Examiner* — Luke Ratcliffe
(74) *Attorney, Agent, or Firm* — Wenderoth, Lind & Ponack, L.L.P.

(57) ABSTRACT

A laser scanning sensor includes a laser range finder, a scanning mechanism, a data acquisition portion, a dirt determination portion, an alert output control portion and a memory. The laser range finder is arranged inside a housing having an opening portion, and the opening portion is covered with a lens cover that can transmit laser light. In the dirt determination portion, a predetermined threshold to be compared with a received light level is changed based on maximum detection distance information in each measurement direction.

2 Claims, 5 Drawing Sheets

(56) References Cited

FOREIGN PATENT DOCUMENTS

| JP | 2007-122508 | 5/2007 |
| JP | 2009-093428 | 4/2009 |
| JP | 2009-110069 | 5/2009 |

OTHER PUBLICATIONS

International Search Report issued Oct. 26, 2010 in International (PCT) Application No. PCT/JP2010/062033.

* cited by examiner (a)

(b)

(c)

Close ← Detection distance → Far

LASER SCANNING SENSOR

TECHNICAL FIELD

The present invention relates to, for example, laser scanning sensors that detect intruders into premises of a building or the like, and particularly, relates to laser scanning sensors capable of maintaining reliability of detection of intruders or the like as much as possible even when the cover of a light-receiving portion is dirty.

BACKGROUND ART

A "security system" has been proposed in which intruders are detected by using a laser range finder that uses laser light as its light source (e.g., see Patent Document 1). Also, an "object distinction method using an area sensor" has been proposed in which laser light is used to accurately distinguish pedestrians or the like, although it is slightly different from security devices or security systems (e.g., see Patent Document 2).

Furthermore, in view of problems in these conventional techniques, the inventor of the present invention has already proposed a laser area sensor in which it is possible to easily set an appropriate security region with which detection errors can be prevented as much as possible according to the actual installation site or security purpose, and in addition, it is possible to easily set an arbitrary security region (see Patent Document 3).

On the other hand, in apparatuses that detect intruders by using a laser range finder or apparatuses that are mounted on a vehicle and measure the distance to the vehicle in front thereof, dirt on the cover of the laser light receiving portion or the like may have an adverse influence on measurement accuracy. Therefore, various techniques for detecting such dirt have been proposed as well (e.g., Patent Documents 4 to 7).

PRIOR ART DOCUMENTS

Patent Documents

[Patent Document 1] JP 3011121B
[Patent Document 2] JP 2004-185363A
[Patent Document 3] JP 2009-093428A
[Patent Document 4] JP H10-090412A
[Patent Document 5] JP 2000-035479A
[Patent Document 6] JP 2000-046948A
[Patent Document 7] JP 2003-114277A

SUMMARY OF INVENTION

Problems to be Solved by the Invention

In the conventional technique disclosed in the Patent Document 4 stated above, for example, dirt is detected with transmitted light that is transmitted through only part of the cover. Therefore, there is a problem that in the case where dirt attaches to the entire cover unevenly, for example, detection accuracy cannot always be guaranteed.

In the conventional techniques disclosed in the Patent Documents 5 and 6 stated above, the distance is measured based only on a period of time taken for laser light to be reflected back to the apparatus by an intruder or a vehicle in front. Because the reflection level of the laser light or the like is not measured and taken into consideration at the same time, some problems may arise regarding the reliability of the measured distance.

In contrast, in the conventional technique disclosed in the Patent Document 7 stated above, dirt is not detected with transmitted light that is transmitted through only part of the cover, and the reflection level of the laser light or the like is also measured at the same time and taken into consideration. However, depending on the setting of a detection level threshold, detection of a distant human body may be impossible. Also, there is a problem that although it is possible to detect a human body even if the cover is a little dirty in the case where the measurement distance range is limited to a comparatively near range depending on the measurement direction, it is detected that the cover is dirty, making it impossible to perform human body detection.

In view of these problems of conventional techniques, the present invention aims to provide a laser scanning sensor capable of reliably detecting a distant human body, preventing an improper alert to the effect that the cover is dirty in the case where, for example, the measurement distance range is limited to a comparatively near range depending on the measurement direction, and providing an appropriate alert also in the case where, for example, the entire cover is unevenly dirty.

Means for Solving the Problems

In order to achieve the above aim, a laser scanning sensor of the present invention is a laser scanning sensor including: a housing in which an opening portion is formed; a cover that is arranged so as to cover the opening portion and that can transmit laser light; a laser range finder that is arranged inside the housing, includes a laser light emitting portion for emitting laser light to outside of the housing through the cover and a laser light receiving portion for receiving laser light and outputting a signal according the amount of the received light, and performs measurement by acquiring distance information to at least one object through measurement of a period of time taken for reflected light caused by the laser light emitted by the laser light emitting portion being reflected by the object to return, and acquiring received light level information of the reflected light; a scanning mechanism portion that changes a measurement direction performed by the laser range finder; an information acquisition portion that forms a detection area, as a result of acquisition of the distance information and the received light level information by the laser range finder being periodically performed while the measurement direction is being changed by the scanning mechanism portion, and that acquires, in time series, the distance information and the received light level information for each measurement direction in the detection area; a storage portion that stores, for each measurement direction, the distance information that corresponds to a farthest side out of the distance information for the measurement direction acquired by the information acquisition portion; a determination portion that determines whether a state in which measurement directions whose distance information corresponds to a near side of a predetermined distance and whose received light level is greater than or equal to a predetermined threshold occupy a predetermined proportion or more of all measurement directions has continued for at least a predetermined period of time; and an alert output control portion that outputs an alert signal according to a result of the determination performed by the determination portion, wherein the predetermined threshold to be compared with the received light level in the determination portion is changed based on the distance information stored for each measurement direction in the storage portion.

Here, for each measurement direction, the predetermined threshold is increased the closer the distance information stored for the measurement direction in the storage portion corresponds to the near side. Note that it is not always necessary to change the predetermined threshold over the entire range of the distance information. For example, the predetermined threshold may be fixed to a predetermined value outside a predetermined range. Also, the predetermined threshold in the predetermined range may be changed linearly or discretely according to the distance information.

With the laser scanning sensor configured as described above, it is possible to reliably detect a distant human body, prevent an improper alert to the effect that the cover is dirty in the case where, for example, the measurement distance range is limited to a comparatively near range depending on the measurement direction, and provide an appropriate alert also in the case where the entire cover is unevenly dirty.

Effects of the Invention

With the laser scanning sensor of the present invention, it is possible to reliably detect a distant human body, prevent an improper alert to the effect that the cover is dirty in the case where, for example, the measurement distance range is limited to a comparatively near range depending on the measurement direction, and provide an appropriate alert also in the case where, for example, the entire cover is unevenly dirty.

DETAILED DESCRIPTION OF THE INVENTION

Embodiments of the present invention will be described below with reference to the drawings.

Schematic Configuration

Figure 1:
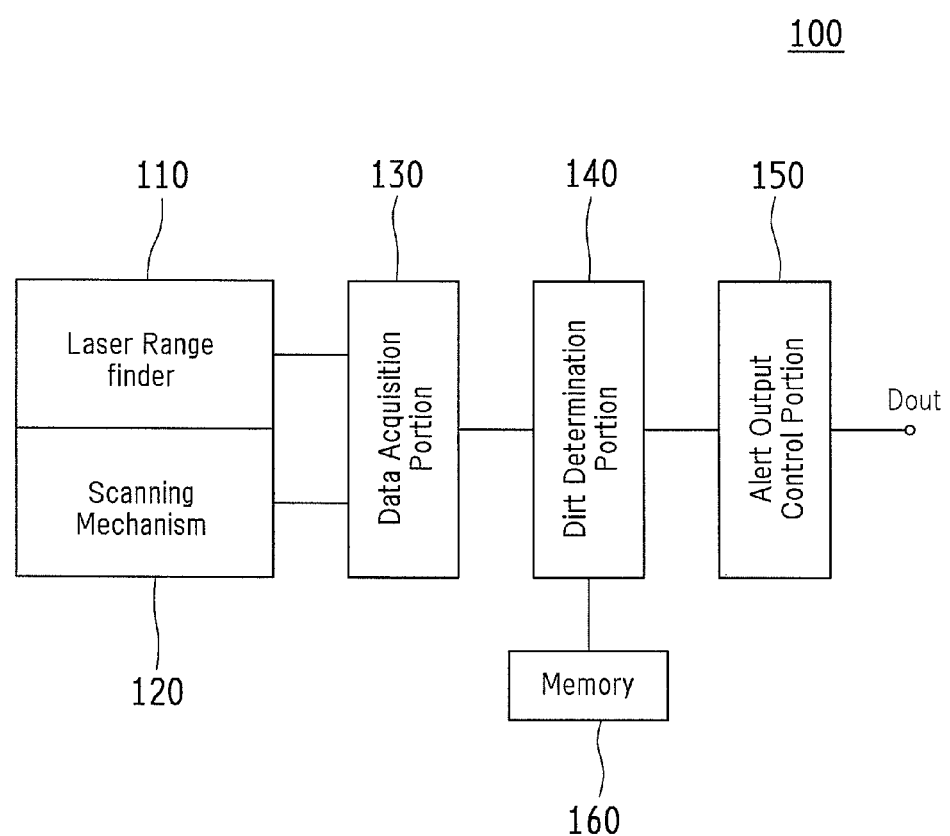
FIG. 1 is a block diagram illustrating a schematic electrical configuration of an entire laser scanning sensor 100 according to an embodiment of the present invention.
Figure 2:
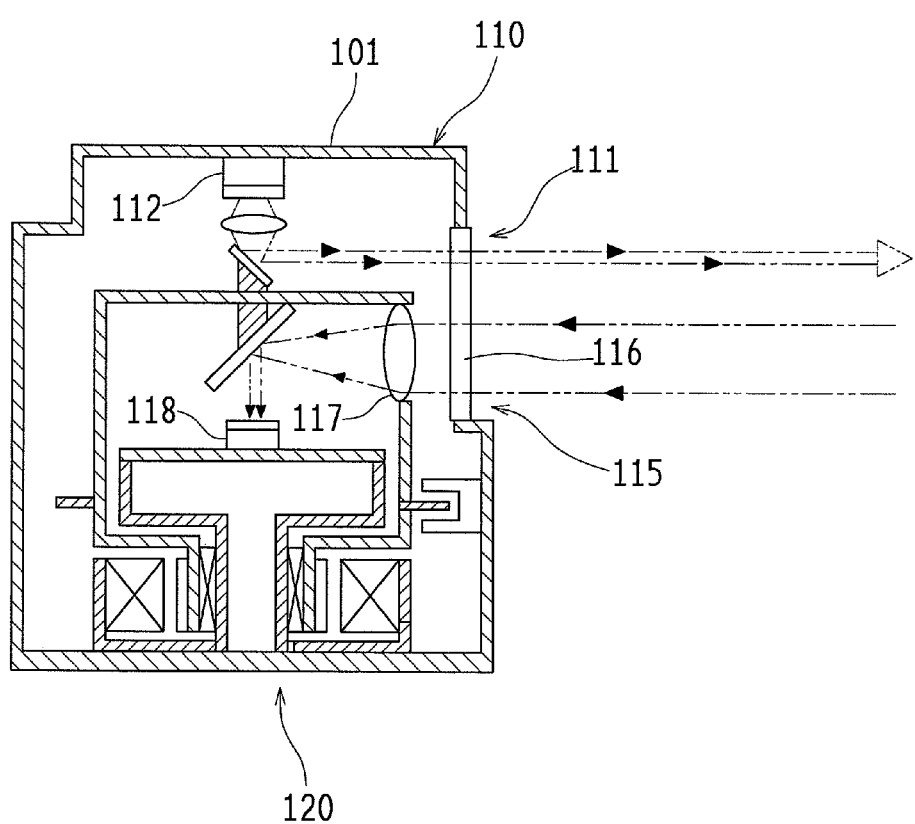
FIG. 2 is a cross-sectional view illustrating a schematic configuration of mainly a laser range finder 110 and a scanning mechanism 120 of the laser scanning sensor 100.
Figure 3:
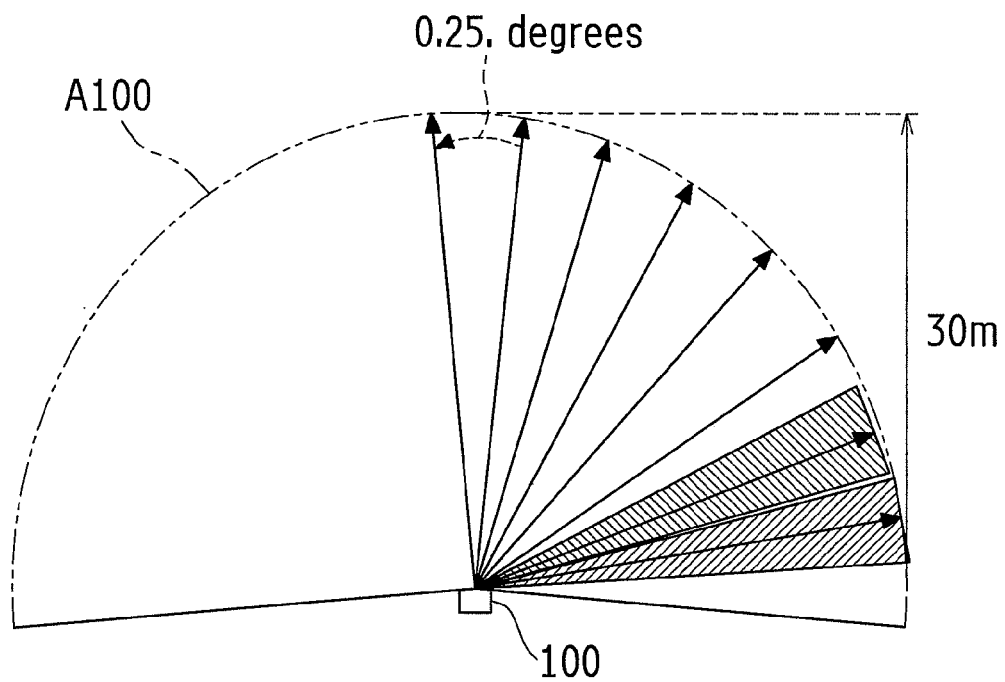
FIG. 3 is a schematic explanatory diagram of a basic detection area A100 formed by the laser scanning sensor 100.

FIG. 1 is a block diagram illustrating a schematic electrical configuration of an entire laser scanning sensor 100 according to an embodiment of the present invention. FIG. 2 is a cross-sectional view illustrating a schematic configuration of mainly a laser range finder 110 and a scanning mechanism 120 of the laser scanning sensor 100. FIG. 3 is a schematic explanatory diagram of a basic detection area A100 formed by the laser scanning sensor 100.

As shown in FIG. 1, the laser scanning sensor 100 includes the laser range finder 110, the scanning mechanism 120, a data acquisition portion 130, a dirt determination portion 140, an alert output control portion 150, and a memory 160. As shown in FIG. 2, the laser range finder 110 includes a laser light emitting portion 111 including a laser light emitting element 112, and a laser light receiving portion 115 including a light-receiving lens 117 and a light-receiving element 118. Also, the laser range finder 110 is arranged inside a housing 101 having an opening portion, and the opening portion is covered with a lens cover 116 through which laser light can be transmitted.

In the laser range finder 110, pulsed laser light emitted from the laser light emitting element 112 of the laser light emitting portion 111 is transmitted through the lens cover 116, and reaches an object such as a human body present outside the housing 101. Part of the laser light reflected by the object returns in the direction of the laser range finder 110, is transmitted through the lens cover 116 and the light-receiving lens 117, and reaches the light-receiving element 118. Then, data of the distance to the object such as a human body is acquired by precisely measuring the short period of time after the pulsed laser light has been emitted from the laser light emitting element 112 until the reflected light thereof reaches the light-receiving element 118, and at the same time, data of the received light level, which indicates the intensity of reflected light, is acquired. Note that in the case where a plurality of objects are present in the emission direction of the laser light, the distance data and the received light level data are acquired for each object.

For example, a semiconductor laser diode (LD) can be used as the laser light emitting element 112 of the laser light emitting portion 111. For example, an avalanche photodiode (APD) can be used as the light-receiving element 118. Although it is desirable to provide, for example, a dedicated hardware circuit or the like for drive control of the light emitting element, measurement of the period of time taken for reflected light to return to the apparatus, and acquisition and recording of the received light level of reflected light, the present invention is not necessarily limited to such a configuration. As general characteristics of the laser range finder, it can perform precise distance measurement up to a considerably long distance. For example, measurement is possible up to several tens of meters, or depending on the situation, a distance far longer than that. Here, a maximum detectable distance Dmax of the laser range finder 110 is assumed to be 30 m.

The scanning mechanism 120 has an unshown motor or the like therein so as to be rotatable, and is mechanically coupled to at least a portion of the laser range finder 110, such that the direction (angle) of measurement by the laser range finder 110 can be changed. For example, a configuration may be adopted in which only the optical system portion of the laser range finder 110 can be rotated. However, a configuration in which the entire laser range finder 110 can be rotated or other configurations may be adopted. As a result of the scanning mechanism 120 rotating in a predetermined direction at a constant speed, the measurement direction by the laser range finder 110 changes in tandem with the rotation.

The data acquisition portion 130 forms the detection area A100 as shown in FIG. 3, as a result of measurement by the laser range finder 110 being periodically repeated while the measurement direction is being changed by the scanning mechanism 120, and acquires, in time series every predetermined period of time, the distance data and the received light level data of reflected light for each of the directions at predetermined angular intervals in the detection area A100.

For example, in the case where the distance is measured by emitting pulsed laser light across a range of 190 degrees while setting a scanning cycle T of the scanning mechanism 120 to 50 ms (scanning is performed 20 times per second), if the pulse width of the pulsed laser light is 34 ns, and the emission cycle is 34.7 μs, distance measurement can be performed 760 times across a range of 190 degrees. The angular interval for the distance measurement in this case is 0.25 degrees, and this corresponds to an interval of no more than about 13 cm even at the point 30 m away, as shown in FIG. 3. Thus, this achieves a very high space resolution for the detection area A100. Therefore, it is possible to highly accurately identify the position, size, shape and the like of an object based on the distance data and the like acquired by the data acquisition portion 130 and thereby determine whether the object is a human body, for example. Thus, even if there are a plurality of human bodies within the detection area A100, it is possible to identify each human body. Such distance data can be obtained every 50 ms, which is the scanning cycle T. Note that the figures indicated here are mere examples.

Figure 4:
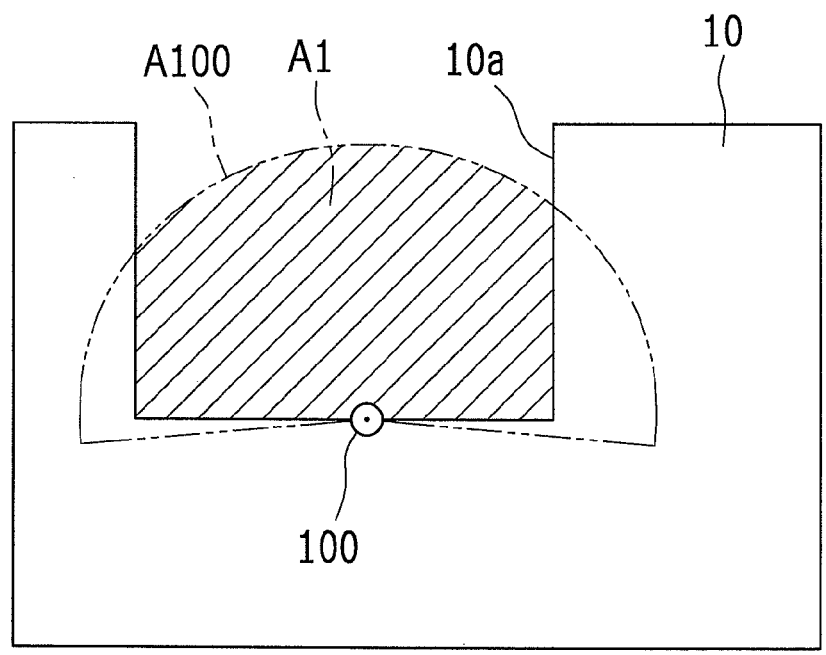
FIG. 4 is a schematic explanatory diagram of a detection area A1 that is actually effective in the case where the laser scanning sensor 100 is installed on a building wall face 10a for the security of a region that is surrounded on three sides by a building 10.

FIG. 4 is a schematic explanatory diagram of a detection area A1 that is actually effective in the case where the laser scanning sensor 100 is installed on a building wall face 10a for the security of a region that is surrounded on three sides by a building 10.

The original detection area A100 of the laser scanning sensor 100 is, as described above, substantially a semi-circular region (the region enclosed with the dashed double-dotted line in FIG. 4) that is centered on the installation point of the laser scanning sensor 100 and has a radius of the maximum detectable distance Dmax (here, 30 m).

However, for example, as shown in FIG. 4, if the laser scanning sensor 100 is installed at substantially the center of the building wall face 10a, laser light is physically blocked by the building wall face 10a or the like depending on the measurement direction. That is, the maximum detectable distance is substantially restricted depending on the measurement direction, and the actual effective detection area is the region A1 hatched in FIG. 4 (hereinafter referred to as "effective detection area A1").

In this case, if no object such as a human body is present in the effective detection area A1, in each of measurement directions in which laser light is physically blocked by the building wall face 10a or the like, the distance to the building wall face 10a is constantly detected. Thus, this distance data is stored in the memory 160 for each of the measurement directions.

Figure 5:
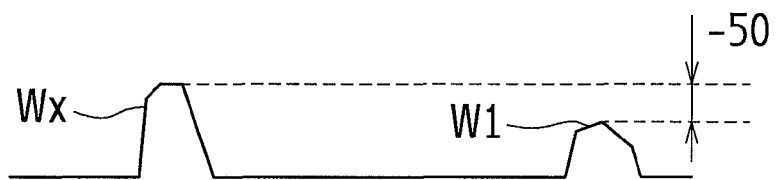
FIG. 5 shows diagrams schematically illustrating waveform examples of a signal that is output from a light-receiving element 118 of a laser light receiving portion 115 immediately after pulsed laser light has been emitted from a laser light emitting element 112 of a laser light emitting portion 111 in the direction in which a human body is present, FIG. 5(a) illustrating a case where the distance to the human body is 30 m, FIG. 5(b) illustrating a case where the distance to the human body is 15 m, and FIG. 5(c) illustrating a case where the distance to the human body is 5 m.
Figure 5:
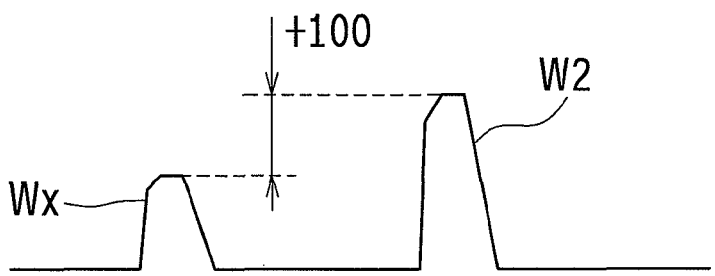
Figure 5:
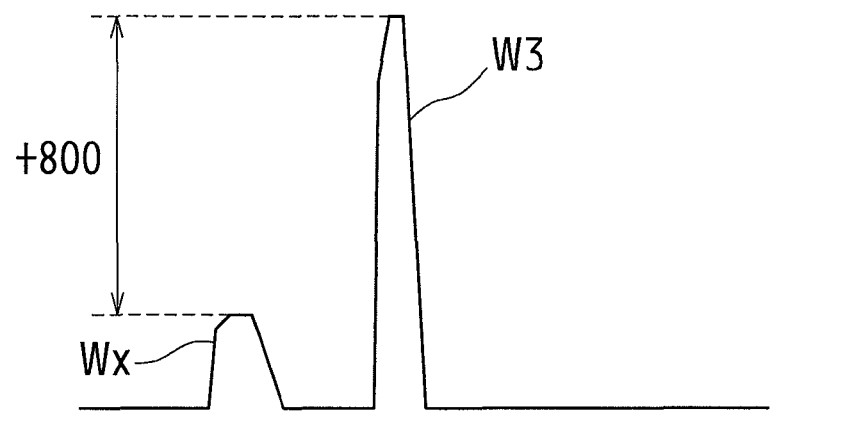

FIGS. 5(a) to 5(c) are diagrams schematically illustrating waveform examples of a signal that is output from the light-receiving element 118 of the laser light receiving portion 115 immediately after pulsed laser light has been emitted from the laser light emitting element 112 of the laser light emitting portion 111 in the direction in which a human body is present. FIG. 5(a) illustrates a case where the distance to the human body is 30 m, FIG. 5(b) illustrates a case where the distance to the human body is 15 m, and FIG. 5(c) illustrates a case where the distance to the human body is 5 m. Note that the horizontal direction in FIGS. 5(a) to 5(c) corresponds to, as indicated in only FIG. 5(c), the detection distance of a human body or the like, and the left side and the right side respectively correspond to the near side and the far side. The vertical direction in FIGS. 5(a) to 5(c) corresponds to the received light level of reflected light received by the light-receiving element 118.

First, a case is assumed in which a human body is present considerably far away from the laser scanning sensor 100 (for example, the distance to the human body is 30 m). In this case, in the signal waveform output from the light-receiving element 118, for example, as shown in FIG. 5(a), a wave W1 (received light level at the peak: 150) having a comparatively low peaked shape appears on the right side, which corresponds to the far side.

If dirt is attached to, for example, an outer portion of the lens cover 116 of the laser light emitting portion 111 and the laser light receiving portion 115 of the laser range finder 110, not the whole of laser light emitted from the laser light emitting element 112 is transmitted through the lens cover 116, and part of the laser light is slightly reflected by the dirt on the lens cover 116, which may reach the light-receiving element 118. Even if it is only a small portion of the laser light that is reflected at this time, since the distance to the lens cover 116 is in extremely short, the received light level of reflected light may have a magnitude that is not ignorable. Also, since the distance to the lens cover 116 is extremely short, in the signal waveform output from the light-receiving element 118, for example, a wave Wx (received light level at the peak: 150) having a comparatively low peaked shape appears on the left side, which corresponds to the near side.

Incidentally, waves having peaked shapes in various sizes may appear in the actual signal output from the light-receiving element 118. Distance data that corresponds to a small wave that appears due to the influence of noise or the like irrespective of actual human bodies or objects should not be treated as effective data.

Accordingly, only waves having peaked shapes whose received light level of reflected light is greater than or equal to a fixed level are subjected to distance detection. Specifically, for example, the detection distance corresponding to the wave W1 is obtained only if the received light level at the peak of the wave W1 shown in FIG. 5(a) is greater than or equal to a predetermined threshold (hereinafter referred to as a "human body detection threshold"). Here, the human body detection threshold is set to 150.

Also, in order to determine, in the case where dirt is attached to the lens cover 116 of the laser light emitting portion 111 and the laser light receiving portion 115 of the laser range finder 110, whether the dirt actually hinders normal detection of a human body or an object, a threshold different from the human body detection threshold (hereinafter referred to as a "dirt detection threshold") is set. In the case where a wave having a peaked shape appeared on the left side, which corresponds to the near side, in the signal waveform output from the light-receiving element 118, an alert to the effect that the lens cover 116 is dirty is provided only when the received light level at the peak thereof is greater than the dirt detection threshold. Specifically, for example, an alert to the effect that the lens cover 116 is dirty is provided only when the received light level at the peak of the wave Wx shown in FIG. 5(a) is greater than or equal to the dirt detection threshold. Here, this dirt detection threshold is set to a value lower than the human body detection threshold, namely, 100, such that the fact that the lens cover 116 is dirty can be detected easily even in the case where detection of an object such as a human body is impossible.

Then, in the case shown in FIG. 5(a), since the received light level at the peak of the wave W1 corresponding to a human body is exactly equal to the human body detection threshold, the wave W1 is subjected to distance detection. Also, since the received light level at the peak of the wave Wx corresponding to the dirt attaching to the lens cover 116 is greater than or equal to the dirt detection threshold, an alert to the effect that the lens cover 116 is dirty is provided. In this case, the received light level of the wave W1 corresponding to a human body may be totally reduced due to influence of the dirt attached to the lens cover 116. For example, if it is assumed that the received light level at the peak of the wave W1 has dropped by 50, the difference in received light level between the peak of the wave W1 and the peak of the wave Wx is −50. In this manner, there is no margin to the human body detection threshold, and thus the dirt detection threshold can be considered to be generally appropriate.

Next, a case is assumed in which a human body is present at a smaller distance from the laser scanning sensor 100 (for example, the distance to the human body is 15 m). In this case, in the signal waveform output from the light-receiving element 118, for example, as shown in FIG. 5(b), a wave W2 (received light level at the peak: 300) having a peaked shape whose received light level at the peak is larger than that of the wave W1 appears at a position equivalent to the near side of the wave W1 in FIG. 5(a). Note that the same description as that given in FIG. 5(a) applies to the wave Wx that is due to dirt on the lens cover 116.

Since the received light level at the peak of the wave W2 corresponding to a human body is greater than the human body detection threshold, the wave W2 is again subjected to distance detection. At this time, the difference between the received light level at the peak of the wave W2 and the human body detection threshold is comparatively large, and it can be said that there is some margin to the human body detection threshold. For example, even assuming that the received light level at the peak of the wave W2 has dropped by 50 as in the case of FIG. 5(a) due to influence of the dirt attached to the lens cover 116, the difference in received light level between the peak of the wave W2 and the peak of the wave Wx is +100.

In contrast, the dirt detection threshold is the same as that in the case of FIG. 5(a), and thus as long as the received light level at the peak of the wave Wx corresponding to the dirt attaching to the lens cover 116 is greater than or equal to the dirt detection threshold, the alert to the effect that the lens cover 116 is dirty is continuously provided, regardless of the magnitude of the difference from the dirt detection threshold. However, since there is some margin to the human body detection threshold, it will not always be necessary to provide the alert to the effect that the lens cover 116 is dirty, depending how dirty the lens cover 116 is. That is, the fixed dirt detection threshold is too low, and it is possible to say that the condition setting regarding provision of the alert to the effect that the lens cover 116 is dirty is not necessarily appropriate.

Next, a case is assumed in which a human body is present at a comparatively short distance from the laser scanning sensor 100 (for example, the distance to the human body is 5 m). In this case, in the signal waveform output from the light-receiving element 118, for example, as shown in FIG. 5(c), a wave W3 (received light level at the peak: 1000) having a peaked shape whose received light level at the peak is larger than that of the wave W2 appears at a position equivalent to the near side of the wave W2 in FIG. 5(b). Note that the same description as that given in FIG. 5(a) applies to the wave Wx that is due to dirt on the lens cover 116.

Since the received light level at the peak of the wave W3 corresponding to a human body is far greater than the human body detection threshold, the wave W3 is also subjected to distance detection. At this time, the difference between the received light level at the peak of the wave W3 and the human body detection threshold is considerably large, and it can be said that there is a sufficient margin to the human body detection threshold. For example, even assuming that the received light level at the peak of the wave W3 has dropped by 50 as in the case of FIG. 5(a) due to influence of the dirt attached to the lens cover 116, the difference in received light level between the peak of the wave W3 and the peak of the wave Wx is +800.

In contrast, the dirt detection threshold is the same as that in the case of FIG. 5(a), and thus as long as the received light level at the peak of the wave Wx corresponding to the dirt attached to the lens cover 116 is greater than or equal to the dirt detection threshold, the alert to the effect that the lens cover 116 is dirty is always provided, regardless of the magnitude of the difference from the dirt detection threshold. However, since there is a sufficient margin to the human body detection threshold, it will not always necessary to provide the alert to the effect that the lens cover 116 is dirty, depending how dirty the lens cover 116 is. That is, also in this case, the fixed dirt detection threshold is too low, and it is possible to say that the condition setting regarding provision of the alert to the effect that the lens cover 116 is dirty is not necessarily appropriate. In addition, the extent of this difference is also far greater than that in the case of FIG. 5(b).

Considering the description given above, for example, in the case where the received light level at the peak of the wave corresponding to a human body is sufficiently great, as in FIGS. 5(b) and 5(c), it is preferable to increase the dirt detection threshold according to the margin to the human body detection threshold, and to not provide an alert about dirt on the lens cover 116 that can be assumed to have no substantial problem for human body detection.

If the detection area formed by the laser scanning sensor 100 matches a basic detection area M00 as shown in FIG. 3, it is impossible to predict, with respect to any of the measurement directions, the distance at which a human body could be detected. The detection distance of a human body could, at its longest, be the maximum detectable distance Dmax, and thus the dirt detection threshold cannot be increased.

However, if the detection area formed by the laser scanning sensor 100 is, for example, the effective detection area A1 as shown in FIG. 4, the maximum detectable distance is substantially restricted depending on the measurement direction. That is, in such a measurement direction, the distance range within which a human body could be detected is narrowed, and it is not possible for a human body to be detected on the far side of the range up to the original maximum detectable distance Dmax. Then, it is preferable to increase the dirt detection threshold for that measurement direction.

Method of Detecting Dirt on the Lens Cover 116

Figure 6:
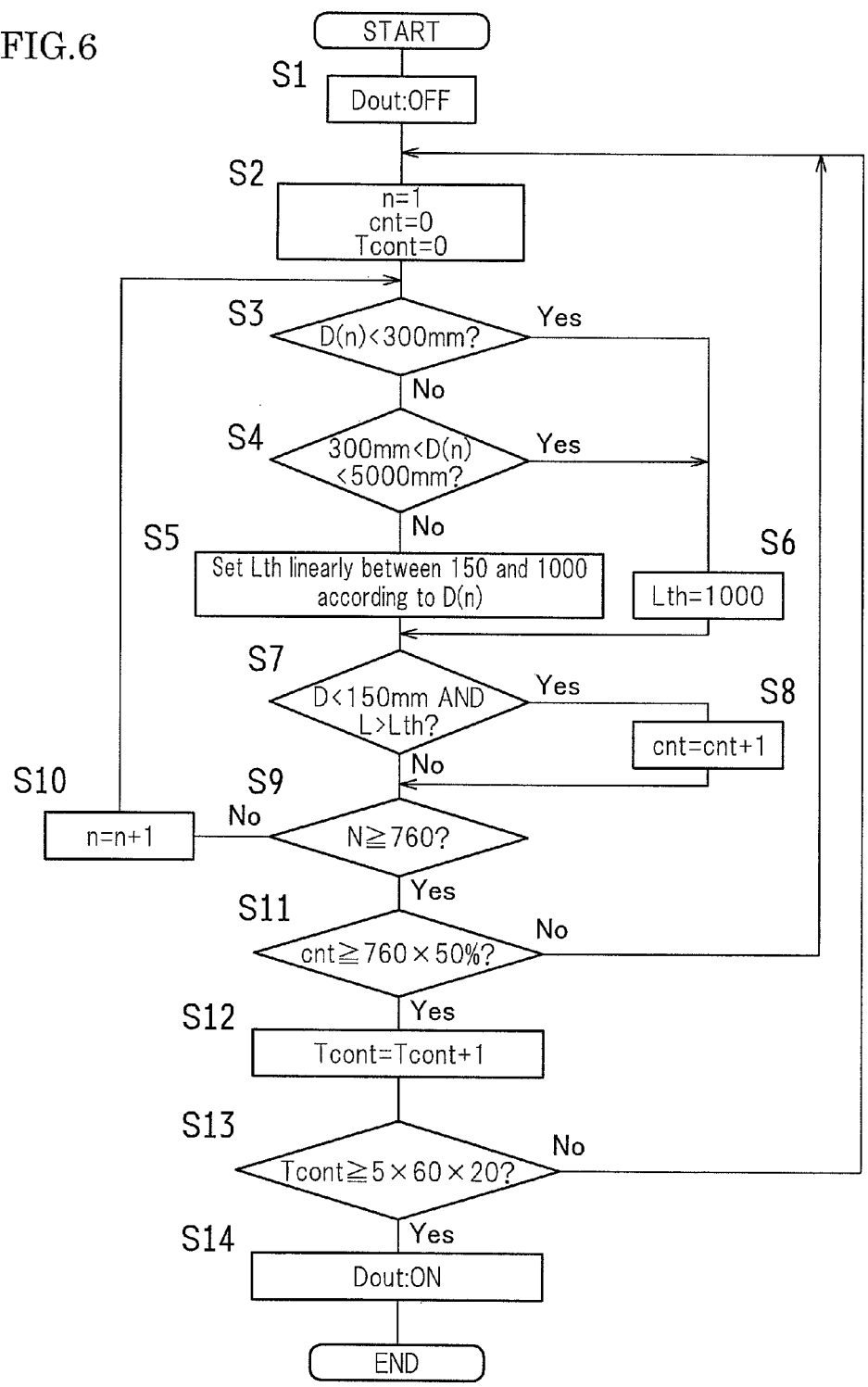
FIG. 6 is a flowchart illustrating an example of a method of detecting dirt on the laser scanning sensor 100.

FIG. 6 is a flowchart illustrating an example of a method of detecting dirt on the laser scanning sensor 100.

First, an alert output signal Dout from the alert output control portion 150 is set to OFF (step S1).

Next, an index counter n for identifying the measurement direction during scanning that is performed at an interval of 0.25 degrees across a range of 190 degrees as described above is initialized to 1, and a counter cnt for counting, in a single instance of scanning, the number of measurement directions in which a dirt detection condition is satisfied is initialized to 0. In addition, a counter Tcont for counting a period of time during which the dirt detection condition is satisfied ("duration time counter Tcont") is initialized to 0 (step S2).

Next, the distance information stored for each measurement direction in the memory 160 is read out, and a threshold Lth that is compared with the received light level in a subsequent step is determined based on the distance information. Specifically, when the distance information in a measurement direction n is D(n), first, D(n) is compared with 300 mm (=30 cm) (step S3). If the determination result is "Yes", the procedure proceeds to step S6, and if "No", the procedure proceeds to step S4.

Here, if the distance data acquired by the laser range finder 110 corresponds to an extremely short distance, it is possible to consider that the data was not generated due to light reflected by an object such as a human body present within the effective detection area A1, but generated as a result of part of laser light reflected by dirt or the like attaching to the lens cover 116 directly reaching the light-receiving element 118. The above-stated "300 mm" is used to determine whether the acquired distance data corresponds to this case. However, this value is of course merely an example. Actually, an appropriate distance may be determined based on the size of the entire laser range finder 110, the position and shape of the lens cover 116, the optical path length of laser light assumed in the case where dirt is attaching to the lens cover 116, for example.

Next, whether D(n), which is the distance information in the measurement direction n, is within a range from 300 mm (=30 cm) to 5000 mm (=5 m) is investigated. If the determination result is "Yes", the procedure proceeds to step S6, and if "No", the procedure proceeds to step S5.

In the case where D(n), which is the distance information in the measurement direction n, is within the range from 5000 mm (=5 m) to 30000 mm (30 m), the threshold Lth is linearly set within a range from 150 to 1000 according to the value of D(n) (step S5).

In contrast, in step S6, the threshold Lth is set to 1000. Note that in this flowchart, in both cases where the determination result is "Yes" in step S3 and where the determination result if "Yes" in step S4, the procedure advances to step S6 and the threshold Lth is set to the same value. However, the present invention is not limited to such a setting, and for example, different arbitrary values may be set for both cases.

Next, in the measurement direction n, the distance data and the received light level acquired at that time (namely, in real-time) are respectively indicated as D and L, and it is determined whether dirt is attached to the lens cover 116 in the measurement direction n based on the data. Specifically, it is determined whether D is less than 150 mm (=15 cm) and concurrently, whether L is greater than the threshold Lth determined in steps S2 to S6, and the counter cnt is incremented only when the determination result is "Yes" (step S8). The procedure advances to step S9 in either case.

Then, it is determined whether measurement in all measurement directions in a single instance of scanning has been finished based on the value of the index counter n. Specifically, the counter value n is compared with 760 (step S9), and if n is less than 760, the index counter n is incremented (step S10) since measurement has not finished in all measurement directions, and the procedure returns to step S2.

If the index counter n is greater than or equal to 760, the proportion of the value of the counter cnt relative to the total number of measurement directions is checked. Specifically, the value of the counter cnt is compared with the value corresponding to 50% of 760, which is the total number of measurement directions. If the comparison result is "Yes", the procedure proceeds to step S12, and if "No", the procedure returns to step S2.

In the case where the value of the counter cnt is greater than or equal to 50% of 760, which is the total number of measurement directions, the duration time counter Tcont is incremented (step S12).

Then, the duration time is checked based on the value of the duration time counter Tcont. Specifically, it is determined whether the duration time is greater than or equal to five minutes (step S13), and if the determination result is "Yes", the procedure proceeds to step S14, and if "No", the procedure returns to step S2. Here, the scanning cycle T is 50 ms (scanning is performed 20 times per second), and thus the value corresponding to five minutes is obtained by 5×60×20.

If the duration time counter Tcont is greater than or equal to five minutes, the alert output signal Dout from the alert output control portion 150 is set to ON (step S14).

With the configuration of the embodiment described above, it is possible to set the threshold Lth for dirt detection for the lens cover 116 to an optimal value for each measurement direction, based on the effective detection area A1 in the place where the laser scanning sensor 100 is actually installed. As a result, it is possible to improve dirt detection accuracy for the lens cover 116. Also, since the dirt detection threshold is automatically increased in a measurement direction in which laser light is physically blocked by the building wall face 10a or the like in the actual effective detection area A1, an improper alert about dirt on the lens cover 116 that does not cause any trouble in actual human body detection is prevented.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description. All modifications or changes that come within the meaning and range of equivalency of the claims are intended to be embraced therein.

This application claims priority on Japanese Patent Application No. 2009-0169141 filed in Japan on Jul. 17, 2009, the entire content of which is incorporated herein by reference. Moreover, all documents cited in this specification are herein incorporated by reference.

DESCRIPTION OF REFERENCE NUMERALS

10 building
10a building wall face
100 laser scanning sensor
101 housing
110 laser range finder
111 laser light emitting portion
112 laser light emitting element
115 laser light receiving portion
116 lens cover
117 light-receiving lens
118 light-receiving element
120 scanning mechanism
130 data acquisition portion
140 dirt determination portion
150 alert output control portion

The invention claimed is:

1. A laser scanning sensor comprising:
   a housing in which an opening portion is formed;
   a cover that is arranged so as to cover the opening portion and that allows laser light to pass therethrough;
   a laser range finder that is arranged inside the housing, includes a laser light emitting portion for emitting laser light to outside of the housing through the cover and a laser light receiving portion for receiving laser light and outputting a signal according an amount of the received laser light, and performs measurement by acquiring distance information to each object through measurement of a period of time taken for reflected light caused by the laser light emitted by the laser light emitting portion being reflected by each object to return, and acquiring corresponding received light level information of the reflected light reflected by each object;
   a scanning mechanism portion that adjusts the laser range finder to change a measurement direction of the laser range finder;
   an information acquisition portion that forms a detection area, as a result of acquisition of the distance information and the received light level information by the laser range finder at each measurement direction, and that sequentially acquires the distance information and the received light level information for each measurement direction in the detection area;

a storage portion that stores, for each measurement direction, the distance information that corresponds to a maximum detectable distance of the distance information for that measurement direction acquired by the information acquisition portion;

a determination portion that determines whether a state in which measurement directions whose distance information has a value less than a predetermined distance and whose received light level is greater than or equal to a predetermined threshold occupy a predetermined proportion or more of all measurement directions has continued for at least a predetermined period of time; and an alert output control portion that outputs an alert signal according to a result of the determination performed by the determination portion, wherein the predetermined threshold to be compared with the received light level of each measurement direction in the determination portion is changed based on the distance information stored for each measurement direction in the storage portion.

2. The laser scanning sensor according to claim 1, wherein, for each measurement direction, the predetermined threshold is increased the lower a value of the distance information stored for the measurement direction in the storage portion.

* * * * *